(12) United States Patent
Moore et al.

(10) Patent No.: US 7,983,873 B2
(45) Date of Patent: *Jul. 19, 2011

(54) NON-CONTACT DEVIATION MEASUREMENT SYSTEM

(75) Inventors: Scott E. Moore, Elk River, MN (US); Brett Olin, Lewiston, ID (US)

(73) Assignee: Alliant Techsystems Inc., Minneapolis, MN (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/131,613

(22) Filed: Jun. 2, 2008

(65) Prior Publication Data

US 2008/0228440 A1 Sep. 18, 2008

Related U.S. Application Data

(63) Continuation of application No. 11/329,215, filed on Jan. 10, 2006, now Pat. No. 7,383,152.

(51) Int. Cl.
*G01B 5/02* (2006.01)
*G01B 5/14* (2006.01)
*G01B 7/02* (2006.01)
*G01B 7/14* (2006.01)
*G01B 11/02* (2006.01)
*G01B 11/14* (2006.01)
*G01B 13/02* (2006.01)

(52) U.S. Cl. .................. 702/159; 702/158; 702/172

(58) Field of Classification Search .......... 702/158, 702/159, 166, 172; 356/3, 3.02, 3.03, 3.1, 356/27, 28

See application file for complete search history.

(56) References Cited

U.S. PATENT DOCUMENTS

| 3,806,252 | A |  | 4/1974 | Harris et al. |
| 4,647,208 | A |  | 3/1987 | Bieman |
| 4,731,853 | A |  | 3/1988 | Hata et al. |
| 4,978,224 | A |  | 12/1990 | Kishimoto et al. |
| 5,076,697 | A |  | 12/1991 | Takagi et al. |
| 5,212,540 | A |  | 5/1993 | Miller |
| 5,351,126 | A |  | 9/1994 | Takada et al. |
| 5,442,573 | A |  | 8/1995 | Bredberg et al. |
| 5,461,478 | A |  | 10/1995 | Sakakibara et al. |
| 5,485,082 | A |  | 1/1996 | Wisspeintner et al. |
| 5,523,843 | A |  | 6/1996 | Yamane et al. |
| 5,617,645 | A |  | 4/1997 | Wick et al. |
| 5,652,432 | A |  | 7/1997 | Yaginuma |
| 5,928,545 | A |  | 7/1999 | Byrd et al. |
| 6,038,028 | A |  | 3/2000 | Grann et al. |
| 6,052,191 | A | * | 4/2000 | Brayden et al. ............... 356/630 |

(Continued)

OTHER PUBLICATIONS

Beam Width, Answers.com, printed on Jun. 21, 2010.*

(Continued)

*Primary Examiner* — Michael Nghiem
(74) *Attorney, Agent, or Firm* — Vidas, Arrett & Steinkraus, P.A.

(57) ABSTRACT

A non-contacting deviation measurement system projects a first line and a second line upon a surface of an object. The projections of the first line and second line are arranged to overlap at an intersection line oriented at a nominal location such that when the surface is oriented at the nominal location, the intersection line appears on the surface. As the location of the surface deviates from the nominal location, the first line and second line as projected upon the surface move away from one another. The distance between the lines may be used to calculate the deviation from the nominal location. The deviation calculated may be compared to a predetermined maximum allowable deviation.

17 Claims, 9 Drawing Sheets

U.S. PATENT DOCUMENTS

| | | | |
|---|---|---|---|
| 6,088,106 | A | 7/2000 | Rockseisen |
| 6,094,269 | A | 7/2000 | Ben-Dove et al. |
| 6,281,679 | B1 | 8/2001 | King et al. |
| 6,289,600 | B1 | 9/2001 | Watts |
| 6,697,147 | B2 | 2/2004 | Ko et al. |
| 6,757,069 | B2 | 6/2004 | Bowles |
| 6,858,857 | B2 | 2/2005 | Pease et al. |
| 6,925,890 | B2 | 8/2005 | Fontenot |
| 6,961,092 | B1 | 11/2005 | Kakiuchi et al. |
| 7,383,152 | B1 | 6/2008 | Moore et al. |
| 2004/0190764 | A1 | 9/2004 | Kokku et al. |
| 2005/0151978 | A1 | 7/2005 | Nakamura et al. |
| 2008/0228440 | A1* | 9/2008 | Moore et al. .................. 702/159 |

OTHER PUBLICATIONS

Haiyin Sun, "Standardization of the definition and measurement of the line length and fan angle of laser line generators", Jul. 20, 1998, Applied Optics, vol. 37, No. 21., pp. 4862-4864.*

StockerYale, "Interactive Calculators", 2010.*

StockerYale, "Laser FAQs", 2010.*

* cited by examiner

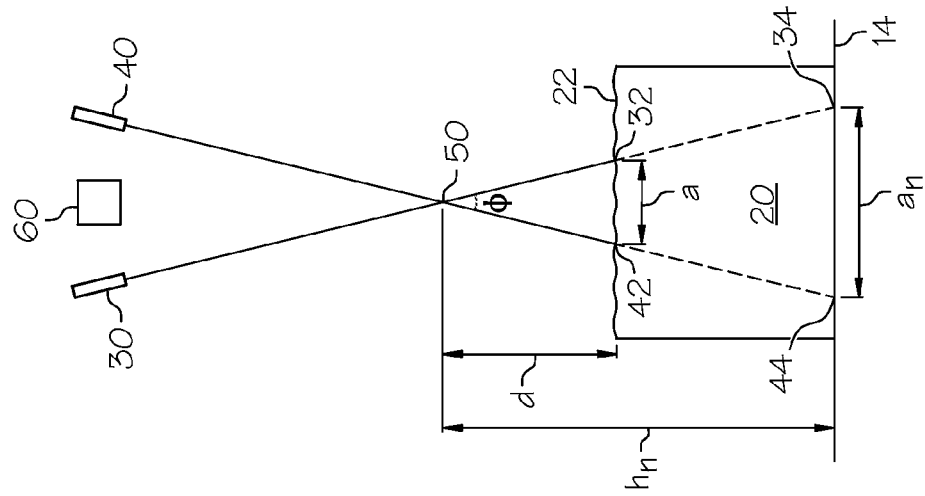
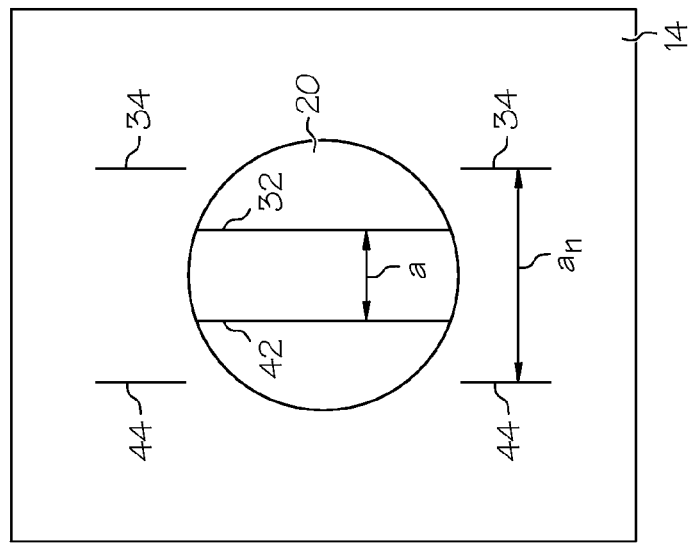
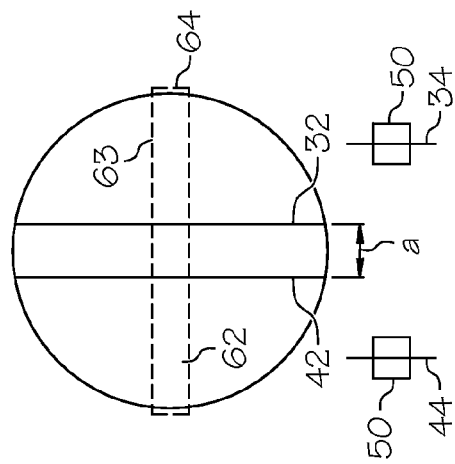
FIG. 8
FIG. 9
FIG. 10

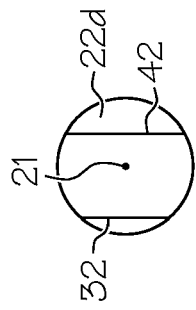
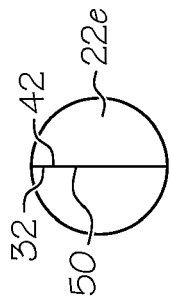
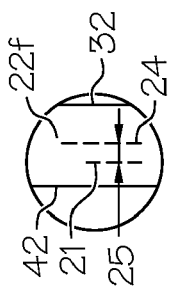
FIG. 12  FIG. 13  FIG. 14
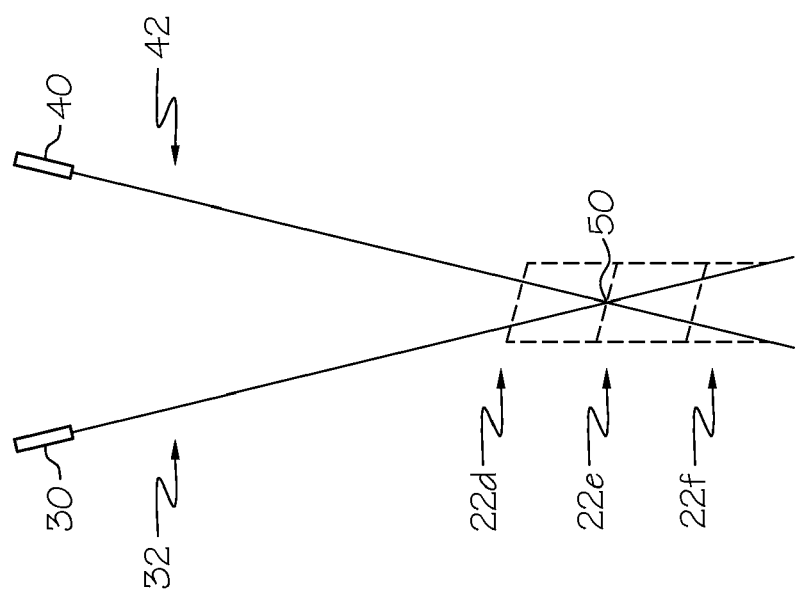
FIG. 11

NON-CONTACT DEVIATION MEASUREMENT SYSTEM

CROSS-REFERENCE TO RELATED APPLICATIONS

This application is a Continuation of and claims priority to U.S. patent application Ser. No. 11/329,215, filed Jan. 10, 2006, now U.S. Pat. No. 7,383,152, the entire contents of which are hereby incorporated herein by reference.

BACKGROUND OF THE INVENTION

This invention relates generally to a measuring system and more specifically to a non-contacting deviation measurement system that may be used, for example, to determine whether the level of propellant in a projectile casing falls within predetermined acceptable ranges.

Projectiles such as bullets and other small caliber ammunition are available in a variety of standard sizes, and as such their structure and function are well known. Projectiles are often manufactured using an assembly line wherein a predetermined amount of propellant is dispensed into a cartridge casing. Prior to insertion of the bullet, the level of propellant is measured to determine whether the actual amount of propellant falls within a predetermined range deemed acceptable for the particular projectile being manufactured.

Existing mechanical propellant level measurement systems generally lower a probe into the casing until the probe contacts the upper surface of the propellant. The height of the probe is then analyzed to determine the height of the propellant column in the casing. The mechanical nature of the contacting probe is subject to inherent variations or errors in the measurements, for example due to slanted propellant in the casing or propellant yielding to the weight of the probe.

With the development of efficient modern propellants, smaller volumes of propellant are required for a given projectile. Thus, the level of precision and accuracy desired in measuring propellant levels may exceed the capabilities of mechanical probe-type measurement systems.

There remains a need for a measuring system capable of repeatable accurate measurements of high sensitivity. Preferably, the measuring system does not contact the object being measured.

All U.S. patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In one embodiment, a deviation measuring system comprises a first projector projecting a first line and a second projector projecting a second line. The projections are oriented such that the first line overlaps the second line at an intersection line. The intersection line is oriented at a nominal location. An optical sensor is positioned to capture an image of the projections of the first line and the second line upon a surface of an object. Analysis software is used to analyze the captured image and calculate the deviation between a location of the surface and the nominal location.

In another embodiment, a method comprises providing a propellant column to be measured and projecting a first line and a second line onto a surface of the propellant column. The projections are oriented such that the first line overlaps the second line at an intersection line, the intersection line oriented at a nominal height. The method further comprises measuring an average distance between the first line and the second line as projected onto the surface of the propellant column and calculating a height deviation between the nominal height and the surface of the propellant column. The calculation is performed using the average distance measured and an intersection angle between the projection of the first line and the projection of the second line.

These and other embodiments which characterize the invention are pointed out with particularity in the claims annexed hereto and forming a part hereof. However, for a better understanding of the invention, its advantages and objectives obtained by its use, reference should be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

FIG. 8 shows a side view of an embodiment of the invention.

FIG. 9 shows a projection of lines onto an example upper surface of an object being measured.

FIG. 10 shows another projection of lines onto an example upper surface of an object being measured.

FIG. 11 shows a side view of an embodiment of the invention and example upper surfaces of an object being measured. Each upper surface is canted about an axis that is parallel to the projected lines.

FIGS. 12-14 show the projections of lines onto the examples of upper surfaces shown in FIG. 11.

DETAILED DESCRIPTION OF THE INVENTION

Figure 1:
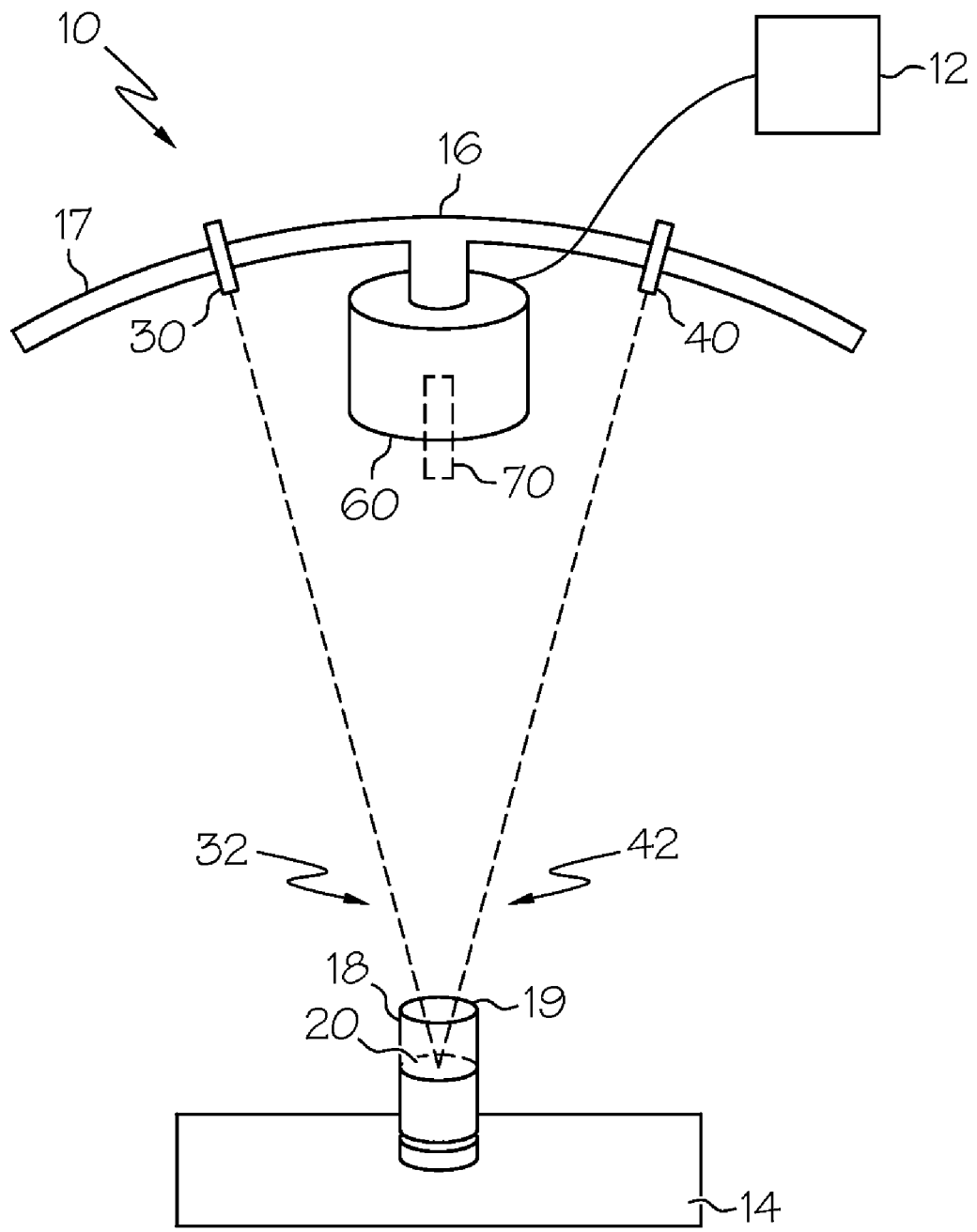
FIG. 1 shows an embodiment of a non-contacting measuring device.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the Figures shall refer to like features unless otherwise indicated.

The relative orientations described herein (i.e. horizontal, vertical, etc.) assume a horizontal platform surface and a measuring system that is oriented vertically above the platform surface. It should be understood that the invention is not limited to specific horizontal and vertical components, and that the use of such terms indicates the orientation of components relative to one another, and not necessarily relative to any particular fixed coordinate system.

In some embodiments, a measurement device 10 may be used to measure the height of a column of propellant, for example within a projectile casing. The measurement device 10 may compare the measured height to a predetermined nominal height, determine deviance from the predetermined nominal height, and evaluate whether the deviance is within predetermined acceptable ranges.

FIG. 1 shows an embodiment of the measurement device 10, which may include a mount 16, a first light projector 30, a second light projector 40, an optical sensor 60, a processor 12 and a tray 14. The tray 14 may comprise a surface suitable for supporting an object that may be measured by the measurement device 10, such as a projectile casing 18 that may be at least partially filled with propellant 20. In some embodiments, the tray 14 may comprise a conveyor or other moveable device that may also be used to transport one or more projectile casings 18.

The first light projector 30 may comprise a light source and may project light, such as laser light, in a first line 32. The second light projector 40 may comprise a light source and may project light, such as laser light, in a second line 42. In some embodiments, each light projector 30, 40 may comprise an independent light source generating light, such as laser light. In some embodiments, each light projector 30, 40 may receive and direct light from a common light source. In some embodiments, each light projector 30, 40 may comprise a laser line generator such as a Micro-Focus Laser Diode Line Generator part #NT55-916 available from Edmund Optics.

The first line 32 and the second line 42 may be projected onto a propellant column 20. The optical sensor 60 may capture an image of the projection of the lines 32, 42 as they appear on the propellant column 20. The relative orientation of the lines 32, 42 may be used to determine the height of the propellant column 20 relative to the predetermined nominal height.

Figure 2:
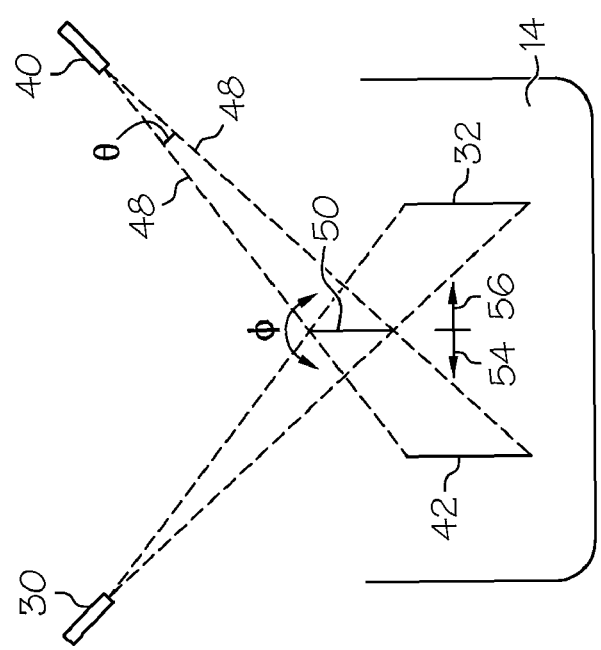
FIG. 2 shows the projection of laser lines in an embodiment of the invention.

FIG. 2 shows a detail of an embodiment of the projections of the first line 32 and the second line 42. The first line 32 and the second line 42 are preferably parallel to one another and arranged to intersect at an intersection line 50. The intersection line 50 may be oriented horizontally and may be located a predetermined nominal distance above the surface of the tray 14. The intersection line 50 represents the desired nominal location of an upper surface of a propellant column containing a predetermined desired amount of propellant.

The first light projector 30 may be oriented on a first side 54 of the intersection line 50 and may project the first line 32 across the intersection line 50. Therefore, at locations above the intersection line 50, the first line 32 may be to the first side 54 of the intersection line 50, and at locations below the intersection line 50, the first line may be to the second side 56 of the intersection line 50. The second light projector 40 may be oriented on the second side 56 of the intersection line 50 and may project the second line 42 across the intersection line 50. Therefore, at locations above the intersection line 50, the second line 42 may be to the second side 56 of the intersection line 50, and at locations below the intersection line 50, the second line 42 may be to the first side 54 of the intersection line 50.

The light projectors 30, 40 may be configured to have any suitable fan angle θ between the outmost rays 48 of the respective laser lines 32, 42. Desirably, the fan angle θ of each light projector 30, 40 is selected to provide an intersection line 50 that has a length that is greater than the diameter of the projectile casing 18 or propellant column 20 (see FIG. 1) being measured. In some embodiments, the fan angle θ of each light projector 30, 40 may be 10 degrees. In some embodiments, the fan angle θ of each light projector 30, 40 is between 10 decrees and 170 degrees.

The angle φ between the two beams projected by the respective light projectors 30, 40 may be any suitable angle that allows for measurement of the propellant column as herein described. The angle φ may generally range from slightly greater than 0 degrees to slightly less than 180 degrees, and may be adjusted depending upon the height of the specific projectile column 20 being measured and the distance between the light projectors 30, 40 and the tray 14. Applications particularly suitable for the invention may range from 10 degrees for small diameter objects where the upper surface of the substrate being measured is relatively far below the top edge of the casing or vessel containing the substrate, to 170 degrees for objects where the substrate surface to be measured is not obstructed by walls of the casing or vessel. Generally, as the angle φ between the two beams increases, the accuracy of the measurement system increases in resolution. In some embodiments, the angle φ between the two beams may be 25 degrees.

Referring again to FIG. 1, the light projectors 30, 40 may be slidably engaged with the mount 16. In some embodiments, the mount 16 may comprise a curved track 17 for each light projector 30, 40. The track(s) 17 may be oriented such that the angle φ between the two beams may be infinitely adjusted while the intersection 50 of the lines 30, 40 remains at the same location. Thus, the path of the track 17 may follow a radius about the intersection line 50. In some embodiments, the light projectors 30, 40 may be connected by a mechanism that keeps the light projectors 30, 40 centered across the image sensor 60, or across a vertical axis.

Figure 3:
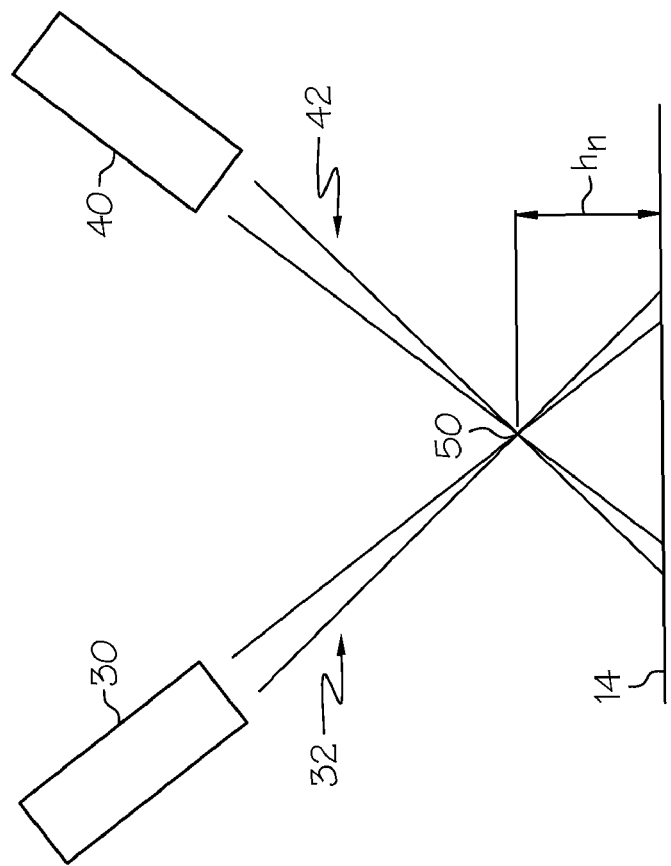
FIG. 3 shows a cross section of the laser lines illustrated in FIG. 2.

FIG. 3 shows a two-dimensional cross-section of the projections and exaggerated thicknesses of the first line 32 and second line 42 in an embodiment of the measurement device 10. The light projectors 30, 40 are each focused to provide the thinnest possible line at the location of the intersection line 50.

The intersection line 50 is preferably oriented at a nominal height $h_n$ above the tray 14. The nominal height $h_n$ may be adjusted depending on the specific type of projectile casing 18 and propellant 20 being used. The nominal height $h_n$ represents the desired distance between a predetermined portion of a projectile casing 18 (see FIG. 1), such as the bottom of the projectile casing 18, and the desired nominal height of the propellant column 20.

Figure 4:
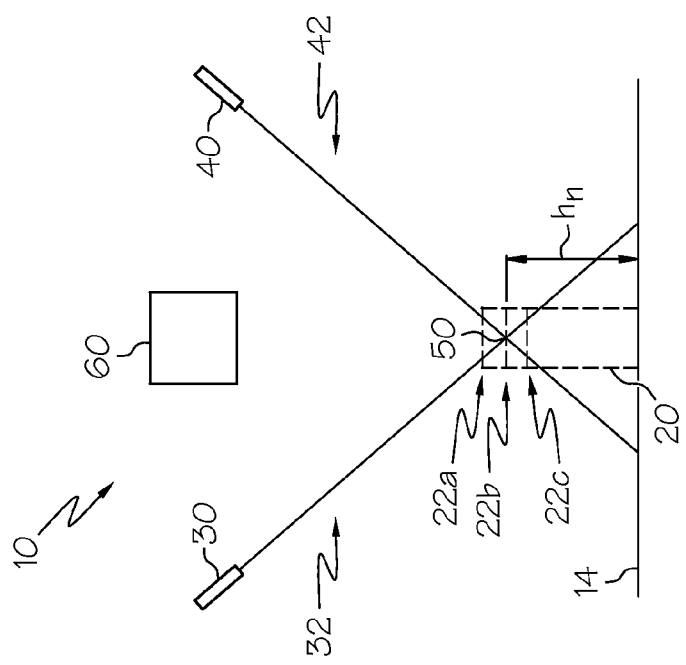
FIG. 4 shows a side view of an embodiment of the invention and example upper surfaces of an object being measured.

FIG. 4 shows a side view of an embodiment of the measurement device 10 showing the projected paths of the first line 32 and the second line 42, and examples of a propellant column 20. A first example upper surface 22a of a propellant column 20 represents the level of propellant being higher than nominal. A second example upper surface 22b of a propellant column 20 represents the level of propellant being at the nominal height. A third example upper surface 22c of a propellant column represents the level of propellant being lower than nominal.

Figure 5:
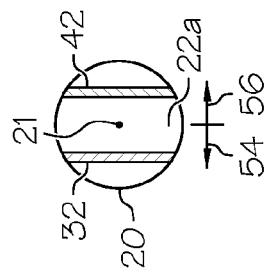
FIGS. 5-7 show the projections of lines onto the examples of upper surfaces shown in FIG. 4.
Figure 6:
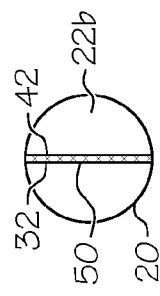
Figure 7:
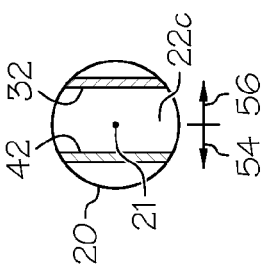

FIGS. 5-7 show projections of the first line 32 and second line 42 on the upper surface examples 22a-22c of the propellant column 20, for example as would be seen by the optical sensor 60 of the measurement device 10. The propellant column 20 is preferably oriented such that a central axis 21 of the propellant column 20 is centered between the laser lines 32, 42 and positioned to intersect the intersection line 50.

FIG. 6 shows an example upper surface 22b that is located at the nominal height $h_n$, wherein the height of the propellant column 20 is at the desired nominal level. The first line 32 and the second line 42 are projected onto the same location of the propellant column upper surface 22b and appear as a single line, i.e. the intersection line 50.

As the location of the upper surface 22 of the propellant column 20 deviates from the nominal level, the width of the line formed by the first line 32 and the second line 42 begins to increase and will eventually transition into the two individual lines 32, 42. As the deviation increases, the first line 32 and the second line 42 will move away from one another.

FIG. 5 shows an example upper surface 22a that is located above the nominal height $h_n$, wherein the height of the propellant column 20 is greater than the desired nominal level. The first line 32 and the second line 42 appear individually. The first line 32 is located to a first side 54 of the axis 21 of the propellant column 20, and the second line 42 is located to a second side 56 of the axis 21 of the propellant column 20. As the location of the upper surface 22a deviates a greater distance above the nominal height $h_n$, the distance between the first line 32 and the second line 42 increases.

FIG. 7 shows an example upper surface 22b that is located below the nominal height $h_n$, wherein the height of the propellant column 20 is less than the desired nominal level. The first line 32 and the second line 42 appear individually, and the relative orientation of the two lines 32, 42 is reversed from that of FIG. 5. The first line 32 is located to the second side 56 of the axis 21 of the propellant column 20, and the second line 42 is located to the first side 54 of the axis 21 of the propellant column 20. As the location of the upper surface 22b deviates a greater distance below the nominal height $h_n$, the distance between the first line 32 and the second line 42 increases.

The distance between the lines 32, 42 as projected on an upper surface 22 of a propellant column 20 may be used to calculate the deviation between the desired nominal height $h_n$ and the actual height of the upper surface 22.

FIG. 8 shows an example propellant column 20 having an upper surface 22 that is lower than nominal. The deviation d from nominal represents the distance between the intersection line 50 and the upper surface 22. In at least one embodiment, the intersection line 50 extends orthogonal to a direction of the deviation d measurement. The deviation d may be calculated using the angle φ between the two beams and the distance a between the lines 32, 42 as projected onto the upper surface according to the following function.

$$d = \frac{a \cot(\frac{\varphi}{2})}{2}$$

In situations where the upper surface 22 is oriented above the intersection line 50, the same calculation may be used to determine the deviation d. The relative location of each line 32, 42 may be used to determine whether the upper surface 22 is above or below nominal, as the position of the lines 32, 42 with respect to one another will reverse above and below the intersection line 50. Therefore, in some embodiments, the first line 32 may be distinguishable from the second line 42, for example by being projected in a different pattern (i.e. a dashed line), a different color, a different wavelength, etc.

The deviation d may be compared to a predetermined maximum acceptable deviation allowed for the particular projectile or propellant column 20 being measured. If the actual deviation d is less than the predetermined maximum acceptable deviation, the propellant 20 level is acceptable and the particular item being measured may be allowed to continue down the assembly line. If the actual deviation d is greater than the predetermined maximum acceptable deviation, the propellant 20 level is not acceptable and the particular item being measured may be rerouted, discarded, etc.

FIG. 9 shows a top view of the propellant column 20 of FIG. 8, for example as may be captured by the optical sensor 60. The two line 32, 42 measuring device 10 is superior to a single line measuring system because the intersection line 50 provides a nominal reference that remains centered in the field of vision of the optical sensor 60.

Further, the projection of the outer ends 34, 44 of each line 32, 42 onto the tray 14 (outside of the propellant column 20) may be used to verify the nominal height $h_n$ of the nominal line 50 above the tray 14. Thus, the measuring device 10 may be self-calibrating by verifying a nominal distance $a_n$ between the ends 34, 44 of each line 32, 42 as projected onto the tray 14. The nominal distance $a_n$ may be predetermined based upon the specific embodiment of the measuring device 10 and the propellant column 20 being measured. The predetermined nominal distance $a_n$ may be verified each time the measuring device 10 measures a propellant column 20. In some embodiments, the light projectors 30, 40 may be mounted to a mounting device that can be moved in a vertical direction, and the system may be calibrated by setting the nominal distance $a_n$ properly prior to each measurement.

In some embodiments, highlights of the lasers on the edge 19 of the mouth of a casing 18 (see FIG. 1) may be used to determine the height of the mouth of the casing 18. This may be used for calibration, verification, etc.

In some embodiments, imaging software and a processor 12 (see FIG. 1) may be used to analyze an image of the lines 32, 42 and determine the deviance d. The optical sensor 60 may capture an image of the lines 32, 42 as they are projected upon the propellant column 20, for example as shown in FIG. 9. The optical sensor 60 may comprise any device suitable for capturing an appropriate image. In some embodiments the optical sensor 60 may be a DVT SmartImage Sensor available from Cognex Corporation, such as the Legend 510 SmartImage Sensor.

The image may be analyzed using any software suitable for analyzing the image and determining the distance a between the lines 32, 42. In some embodiments, the software may comprise DVT Intellect software available from Cognex Corporation.

FIG. 10 shows an example of an image that may be captured by the optical sensor 60 and analyzed to determine the distance a between the lines 32, 42. As illustrated in FIG. 3, the lines 32, 42 are focused at the intersection line 50. Thus, as the height of the propellant column 20 deviates from the nominal height, the projection of the lines 32, 42 will increase in width and eventually transition into the two separate lines 32, 42. Therefore, in determining the distance a between the lines 32, 42, the analysis software may actually determine the distance between opposed outer edges of the lines 32, 42.

The analysis software may determine the distance a by evaluating portions of the lines 32, 42 that fall within an analysis area 62, which may have a length 63 and a width 64. The length 63 may be oriented perpendicular to the intersection line 50, may be of any suitable dimension and is preferably long enough to encompass the outer bounds of the possible locations of the lines 32, 42. Thus, the length 63 is preferably equal to or greater than the diameter of the propellant column 20. The analysis area 62 may have any suitable width 64. In some embodiments, the width 64 may be small in relation to the length 63. In some embodiments, the width 64 may be approximately equal to four times (4×) the diameter of the grain size of the propellant 20 being measured, which eases measurement variation due to the granular structure of the surface of the propellant column 20. Preferably, the analysis area 62 is centered upon the propellant column 20.

In some embodiments, one or more calibration analysis areas 50 may be defined, and may be used for calibration of the measurement device 10.

Preferably, the propellant columns 20 being measured will have an upper surface 22 that is substantially flat and oriented substantially horizontally. In some embodiments, a casing 18 may be tapped, vibrated or otherwise acted upon to encourage a flat and horizontally oriented upper surface 22 prior to being measured. In some embodiments, a pin with a flat bottom may be lowered into the casing 18 to shape the upper surface 22.

In some embodiments, a propellant column 20 being measured may have an upper surface 22 that is not horizontal. Various slopes and orientations of an upper surface 22 may produce various orientations of line 32, 42 projections.

FIG. 11 shows three examples of upper surfaces 22d, 22e, 22f of a propellant column 20 that are not horizontal. Each upper surface 22d, 22e, 22f is canted about an axis that is parallel to the intersection line 50. FIGS. 12-14 show examples of line 32, 42 projections onto the upper surfaces 22d, 22e, 22f.

Although upper surface 22e is not horizontal, the center of the upper surface 22e is oriented at the nominal height. Thus, the intersection line 50 appears as a single line in FIG. 13.

FIGS. 12 and 14 show line projections upon canted upper surfaces 22d, 22f oriented above and below nominal level, respectively. It can be seen that the lines 32, 42 are not centered across the central axis 21 of the propellant column 20 (see FIGS. 5 and 7 for examples of when the lines 32, 42 are centered across the central axis 21 of the propellant column 20). Thus, a midline 24 (see FIG. 14) drawn equidistant between the lines 32, 42 does not pass through the axis 21. The offset 25 indicates that the upper surface 22d, 22f is canted and the height deviates from the nominal height. The fact that the lines 32, 42 are parallel to one another indicates that the cant is across an axis that is parallel to the intersection line 50.

Figure 16:
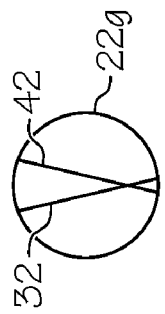
FIGS. 16-18 show the projections of lines onto the examples of upper surfaces shown in FIG. 15.
Figure 17:
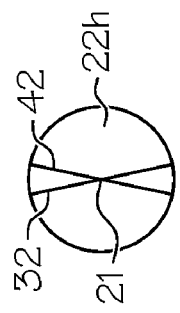
Figure 18:
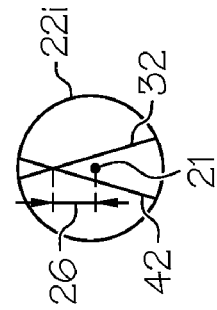
Figure 15:
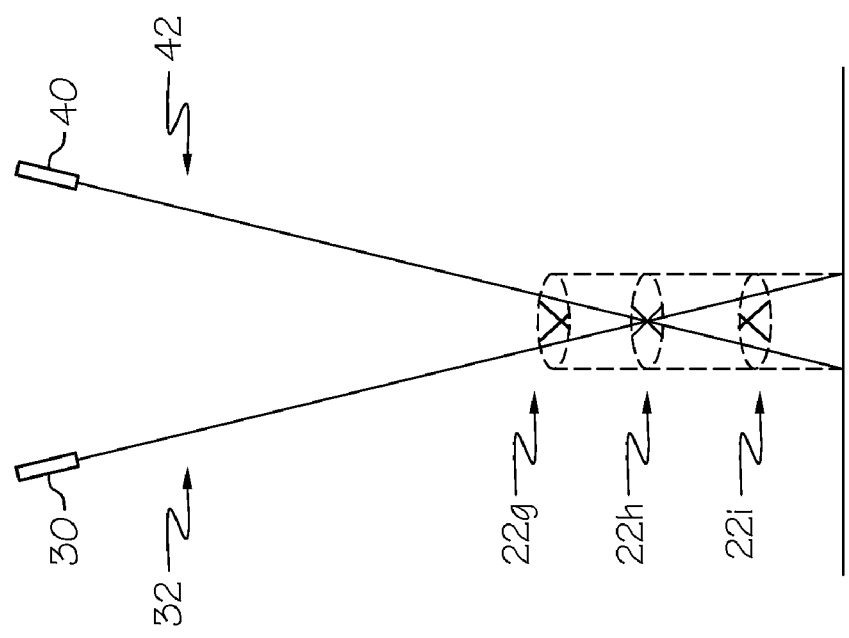
FIG. 15 shows a side view of an embodiment of the invention and example upper surfaces of an object being measured. Each upper surface is canted about an axis that is perpendicular to the projected lines. The view of FIG. 15 is taken from the same location as the view of FIG. 11.

FIG. 15 shows three examples of an upper surface 22g, 22h, 22i of a propellant column 20 that is not horizontal. Note that the view of FIG. 15 is taken from the same location as the view of FIG. 11. Each upper surface 22g, 22h, 22i is canted about an axis that is perpendicular to the intersection line 50. FIGS. 16-18 show examples of line 32, 42 projections onto the upper surfaces 22g, 22h, 22i.

Referring to FIG. 17, the lines 32, 42 are nonparallel to the intersection line 50, which indicates a cant about an axis that is perpendicular to the intersection line 50. The center 21 of the upper surface 22h is oriented at the nominal height, and thus the lines 32, 42 intersect at the axis 21 of the propellant column 20.

FIGS. 16 and 18 show line projections upon canted upper surfaces 22g, 22i oriented above and below nominal level, respectively. It can be seen that the intersection of the lines 32, 42 is offset from the central axis 21 of the propellant column 20. The offset 26 indicates that the upper surface 22g, 22i has deviated from nominal.

In operation, various orientations of actual upper surfaces 22 of propellant columns 20 may produce many variations in the appearance of the lines 32, 42 that differ from the examples illustrated herein. The analysis area 62 (see FIG. 10) is desirably shaped to minimize any error imparted by orientation of the upper surface 22. Particularly, a small width 64 dimension coupled with an analysis area 62 centered upon the propellant column 20 leads to lines 32, 42 in the analysis area 62 that are close together when the average upper surface 22 height is close to nominal, and lines 32, 42 that are farther apart as the average upper surface 22 height deviates from nominal. This may be seen by superimposing an analysis area 62 onto FIGS. 5-7, 12-14 and 16-18.

When one or both of the lines 32, 42 are oriented at an angle to the intersection line 50, the distance a between the lines 32, 42 that is calculated may comprise an average distance a between the lines 32, 42 taken across the width 64 of the analysis area 62.

The inventive measurement device 10 has demonstrated the capacity of measuring deviations within ±0.005". This figure is in contrast to the prior art mechanical probe-type measuring systems, wherein propellant settling can cause variations of ±0.05" or more. The inventive measurement device 10 further has the capability of much higher resolutions depending on the angle φ (see FIG. 8) between the two laser projections. A larger angle φ allows a higher sensitivity.

In some embodiments, the optical sensor 60 and analysis software may be capable of distinguishing the first line 32 from the second line 42, and thus, depending on the relative orientation of the lines 32, 42, may be able to indicate whether the deviation d is positive or negative (i.e. above or below nominal).

Referring to FIG. 1, in some embodiments, a third light projector 70 may be used to project an additional line that may be used to determine whether the deviation d is positive or negative. This may be useful in situations where the first line 32 is not distinguishable from the second line 42, for example when the light projected is identical, or when the optical sensor 60 or the analysis software is not capable of distinguishing the lines 32, 42 from one another.

Figure 19:
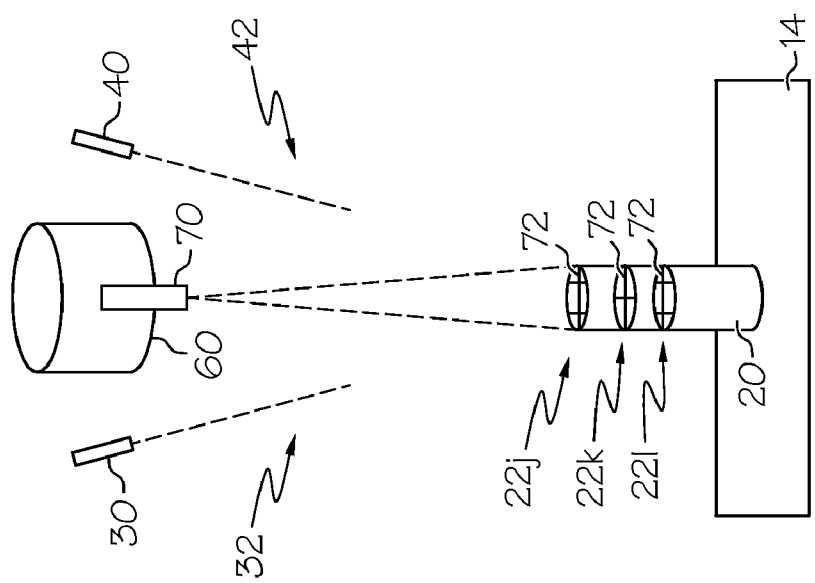
FIG. 19 shows another embodiment of the invention.

FIG. 19 shows an embodiment of the measurement device 10 having a third light projector 70, which may comprise a light source and may project light, such as laser light, in a third line 72. The third line 72 may be oriented perpendicular to the intersection line 50. The third line 72 may be projected such that it will bisect the intersection line 50 at the nominal height. Thus, the third line 72 will intersect the central axis 21 of the propellant column 20 when the upper surface 22 is oriented at the nominal height. The third line 72 may further be projected at an angle to vertical such that when the upper surface 22 is above nominal, the third line 72 will be offset from the axis 21 in one direction, and when the upper surface 22 is below nominal, the third line will be offset from the axis 21 in an opposite direction.

Figure 20:
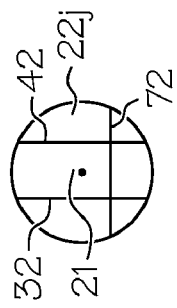
FIGS. 20-22 show the projections of lines onto the examples of upper surfaces shown in FIG. 19.
Figure 21:
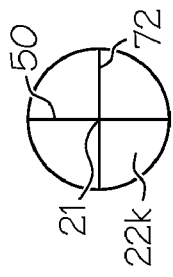
Figure 22:
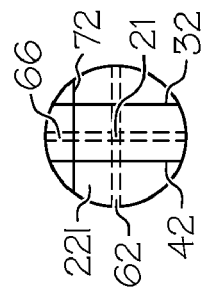

FIGS. 20-22 show examples of line 32, 42, 72 projections onto the example upper surfaces 22j, 22k, 22l shown in FIG. 19. FIG. 21 shows an upper surface 22k oriented at the nominal level. The first line 32 and the second line 42 overlap and form the intersection line 50. The third line 72 intersects the intersection line 50 at the central axis 21 of the propellant column 20. In some embodiments, the third line 72 bisects the intersection line 50 at a bisection location.

FIG. 20 shows an upper surface 22j oriented above the nominal height. The first line 32 and the second line 42 appear separately, while the third line 72 is offset from the axis 21 of the propellant column 20 in a first direction. Thus, the third line 72 is offset from the bisection location discussed with respect to FIG. 21.

FIG. 22 shows an upper surface 22l oriented below the nominal height. The first line 32 and the second line 42 appear separately, while the third line 72 is offset from the axis 21 of the propellant column 20 in a second direction. The second direction is opposite the first direction of FIG. 20. FIG. 22 also shows an analysis area 62 used to determine deviation of the propellant column 20 from nominal, and a second analysis area 66 used to determine presence and location of the third line 72.

Figure 23:
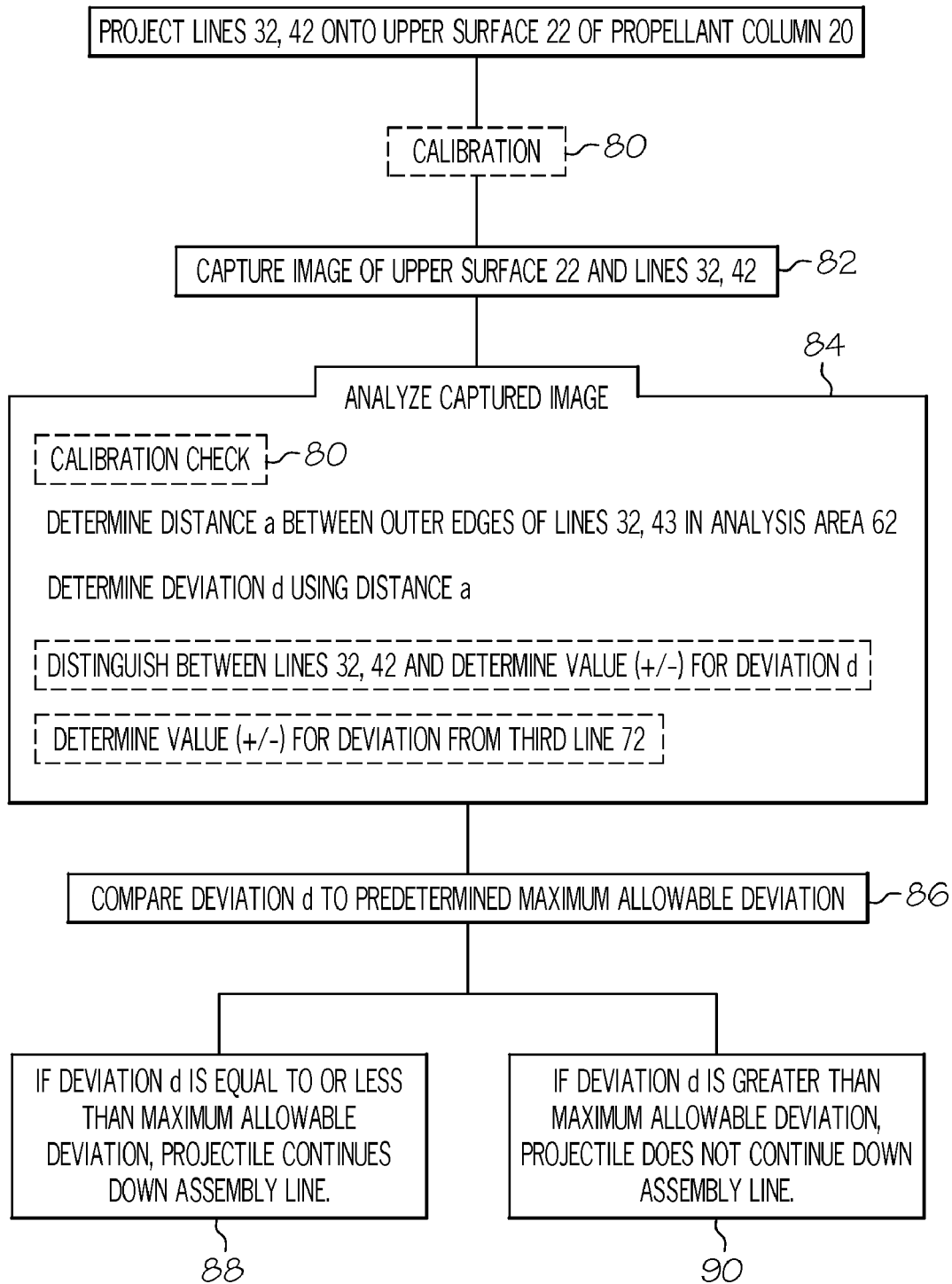
FIG. 23 shows a flowchart for a procedure for measuring an object using an embodiment of the invention.

FIG. 23 shows a flowchart illustrating various steps that may be performed in measuring the deviance d from nominal of the height of a propellant column 20. A casing 18 may be filled with propellant 20 and oriented within the field of view of the measuring device 10 upon the tray 14. In some embodiments, a casing 18 may be tapped to encourage a horizontal upper surface 22 of the propellant column 20. The lines 32, 42 may be projected upon the upper surface 22 of the propellant 20.

Figure 24:
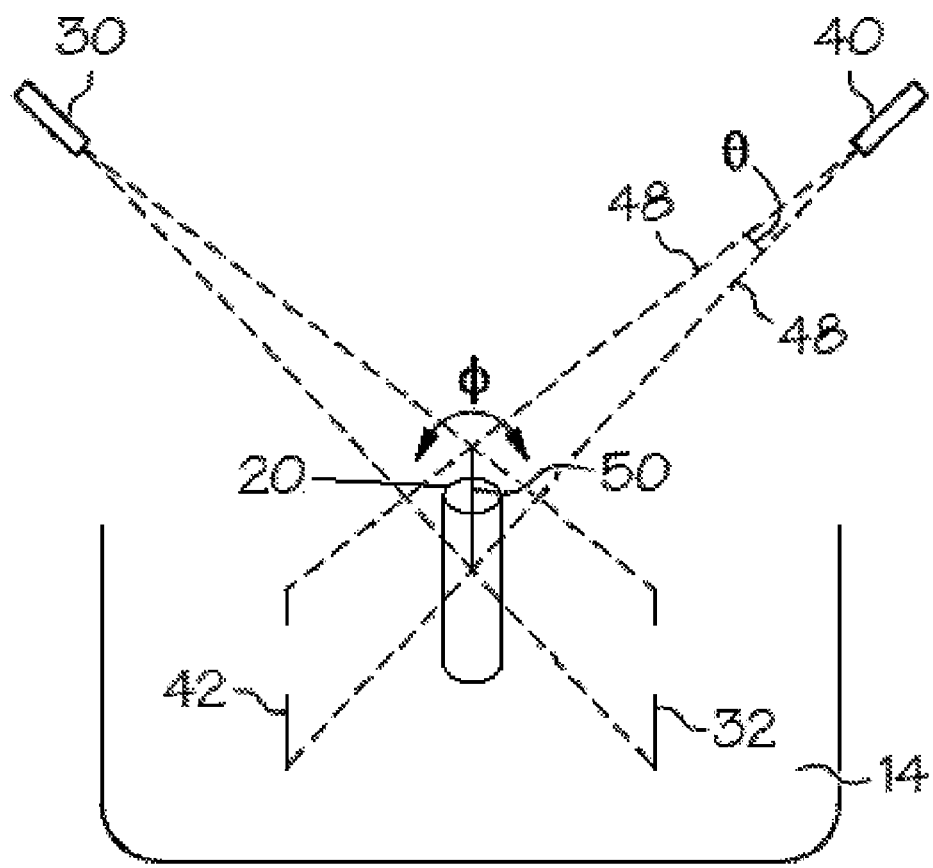
FIG. 24 shows the projection of laser lines in an embodiment of the invention and an object being measured.

FIG. 24 shows the projection of laser lines 32, 42 in an embodiment of the invention and an object 20 being measured. The intersection line 50 has a length that is greater than a distance across the surface of the object 20 being measured.

In some embodiments, an optional calibration step 80 may be performed. A calibration 80 may be used to set the height of the projectors 30, 40 by checking the distance $a_n$ between the ends 34, 44 of the lines 32, 42 as projected onto the tray 14 (see FIGS. 8 and 9). A calibration 80 may also verify the height of the mouth 19 of the casing 18 by verifying the positions of highlights of the lines 32, 42 on the mouth 19 of the casing 18. This step may also be used to verify the diameter of the casing 18.

As shown in FIG. 1, the image sensor 60 may be fixedly attached to the mount 16. Thus, the position of the image sensor 60 may be fixed in relation to the intersection line 50. In a calibration procedure 80, the mount 16, image sensor 60 and light projectors 30, 40 may be moved collectively in relation to the tray 14, the propellant column 20 and the casing 18 in order to set the nominal height $h_n$.

Referring again to FIG. 23, an image of the lines 32, 42 as projected onto the upper surface 22 may be captured 82 by the image sensor 60. The captured image may be analyzed 84 by the analysis software. The distance a between the outer edges of the lines 32, 42 as they appear in the analysis area 62 may be determined and used to calculate the deviation d. In some embodiments, a calibration 80 check may be performed at this time. In some embodiment, the relative locations of the lines 32, 42 may be used to determine the value (±) of the deviation d (above or below nominal). In some embodiments, the location of a third line 72 may be used to determine the value (±) of the deviation d.

The calculated deviation d may be compared 86 to a predetermined maximum allowable deviation. The amount of maximum allowable deviation may be determined according to the specific projectile being manufactured.

In situations where the actual deviation d is equal to or less than the maximum allowable deviation, the projectile is accepted 88 and allowed to continue down the assembly line.

In situations where the actual deviation d is greater than the maximum allowable deviation, the projectile is rejected 90 and does not continue down the assembly line. The projectile may be discarded, or in some embodiments may be emptied and once again filled with propellant and analyzed by the measuring device 10.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A deviation measuring system comprising:
   a first projector arranged to project a first line and a second projector arranged to project a second line, said first line comprising a wavelength that is different from a wavelength of said second line, the first line overlapping the second line at an intersection line, the intersection line oriented at a nominal location;
   a sensor positioned to capture an image of the projections of the first line and the second line upon a surface of an object; and
   analysis software to analyze the image, the analysis software capable of distinguishing the first line from the second line at multiple line orientations, the analysis software calculating the deviation between a location of the surface and the nominal location;
   wherein each projector is moveable along an arcuate path; and
   wherein said intersection line defines a center of each arcuate path.

2. The deviation measuring system of claim 1, wherein said intersection line extends orthogonal to a direction of the deviation measurement.

3. The deviation measuring system of claim 1, wherein said first line appears different from said second line.

4. The deviation measuring system of claim 1, wherein said sensor is an optical sensor.

5. The deviation measuring system of claim 1, comprising a mount, said first projector attached to said mount.

6. The deviation measuring system of claim 5, wherein said first projector is slidably engaged with said mount.

7. The deviation measuring system of claim 5, wherein said first projector is moveable between a plurality of predetermined positions on said mount.

8. The deviation measuring system of claim 7, wherein each stop position is located an equal distance from said intersection line.

9. The deviation measuring system of claim 1, wherein said first and second projectors are moveable with respect to one another to adjust an angle between the first projection and the second projection.

10. The deviation measuring system of claim 1, further comprising a third projector arranged to project a third line upon the surface of said object.

11. The deviation measuring system of claim 10, wherein the third line is oriented nonparallel to said intersection line.

12. A deviation measuring system comprising:
a first projector arranged to project a first line and a second projector arranged to project a second line, the first line overlapping the second line at an intersection line, the intersection line oriented at a nominal location;
a sensor positioned to capture an image of the projections of the first line and the second line upon a surface of an object; and
analysis software to analyze the image, the analysis software calculating the deviation between a location of the surface and the nominal location;
wherein a length of said intersection line is greater than a distance across said surface.

13. A deviation measuring system comprising:
a first projector arranged to project a first line upon a surface of an object and a second projector arranged to project a second line upon the surface of the object, the first line overlapping the second line at an intersection line, the intersection line oriented at a nominal location;
a sensor positioned to capture an image of the projections of the first line and the second line upon said object; and
analysis software to analyze the image, the analysis software capable of distinguishing the first line from the second line at multiple line orientations, the analysis software calculating the deviation between a location of the surface and the nominal location;
wherein a fan angle of the projection of the first line is greater than zero, and a length of said intersection line is greater than a distance across said surface.

14. The deviation measuring system of claim 13, wherein said fan angle is between 10 degrees and 170 degrees.

15. A deviation measuring system comprising:
a first projector arranged to project a first line and a second projector arranged to project a second line, the first line overlapping the second line at an intersection line, the intersection line oriented at a nominal location;
a third projector arranged to project a third line upon the surface of said object, the third line oriented nonparallel to said intersection line;
a sensor positioned to capture an image of the projections of the first line and the second line upon a surface of an object; and
analysis software to analyze the image, the analysis software calculating the deviation between a location of the surface and the nominal location;
wherein said third line bisects said intersection line at a bisection location when said surface is positioned at said nominal location.

16. The deviation measuring system of claim 15, wherein said third line is offset from said bisection location in a first direction when said surface is positioned above said nominal location.

17. The deviation measuring system of claim 16, wherein said third line is offset from said bisection location in a second direction when said surface is positioned below said nominal location.

* * * * *

UNITED STATES PATENT AND TRADEMARK OFFICE
CERTIFICATE OF CORRECTION

| | | |
|---|---|---|
| PATENT NO. | : 7,983,873 B2 | Page 1 of 1 |
| APPLICATION NO. | : 12/131613 | |
| DATED | : July 19, 2011 | |
| INVENTOR(S) | : Moore et al. | |

It is certified that error appears in the above-identified patent and that said Letters Patent is hereby corrected as shown below:

Column 4, Line 16, delete "decrees" and insert --degrees--.

Signed and Sealed this
Eighteenth Day of October, 2011

David J. Kappos
*Director of the United States Patent and Trademark Office*